United States Patent Office 3,630,868
Patented Dec. 28, 1971

3,630,868
PROCESS FOR ACCELERATING THE RADIATION INDUCED POLYMERIZATION OF N-VINYL-PYRROLIDONE
Nelson S. Marans, Silver Spring, Md., assignor to W. R. Grace & Co., New York, N.Y.
No Drawing. Continuation-in-part of application Ser. No. 559,426, June 22, 1966. This application Apr. 23, 1969, Ser. No. 818,790
Int. Cl. C08d 1/00; C08f 1/16
U.S. Cl. 204—159.22                                           7 Claims

ABSTRACT OF THE DISCLOSURE

In abstract, this invention is directed to a process for accelerating the rate of radiation induced polymerization of monomeric N-vinylpyrrolidone by mixing about 10–90 parts of the N-vinylpyrrolidone with a sufficient quantity of a monomeric acrylamide or acrylic acid to make about 100 parts and irradiating the thus formed mixture, all as recited hereinafter.

CROSS REFERENCE TO RELATED APPLICATION

This is a continuation-in-part of copending application Ser. No. 559,426, filed June 22, 1966 and now abandoned.

BACKGROUND OF THE INVENTION

This invention is in the field of radiation induced polymerization of N-vinylpyrrolidone.

More specifically, this invention relates to a very excellent, unobvious, and novel process for accelerating the radiation induced polymerization of N-vinylpyrrolidone said process being set forth in the summary which occurs infra.

Prior art radiation induced methods of polymerization are taught by the following U.S. Pats. 2,982,762 (260/83.3, Voeks et al.); 3,247,012 (117/93.31, Burlant); and 3,281,263 (117/62, Priesing et al.).

SUMMARY OF THE INVENTION

In summary, this invention is directed to an improvement in the process for polymerizing N-vinylpyrrolidone by irradiating said N-vinylpyrrolidone with high energy ionizing radiation, the improvement comprising accelerating the rate of polymerization by:

(a) Preparing a layer of a mixture consisting essentially of about 10–90 parts of N-vinylpyrrolidone monomer and a sufficient quantity of a monomer selected from the group consisting of acrylamide andacrylic acid to make about 100 parts, said layer having a thickness of about 0.005–5 millimeters; and (b) Maintaining the temperature of said layer at about 0–80° C. while irradiating it with a dose of 0.3–2 megarads of said radiation, whereby substantially all of said N-vinylpyrrolidone is polymerized.

DESCRIPTION OF PREFERRED EMBODIMENTS

In preferred embodiments of the invention set forth in the above summary:

(1) The group member is acrylamide.
(2) The mixture consists essentially of 30–70 parts of N-vinylpyrrolidone monomer and a sufficient quantity of a monomer selected from the group consisting of acrylamide and acrylic acid to make a total of about 100 parts.

(3) The radiation dose is about 0.5–1 megarad.
(4) The high energy ionizing radiation is a high energy electron beam.

In another preferred embodiment ("Embodiment A") the invention is directed to an improvement in the process for polymerizing N-vinylpyrrolidone by irradiating said N-vinylpyrrolidone with high energy ionizing radiation comprising accelerating the rate at which said N-vinylpyrrolidone is polymerized by:

(a) Preparing a layer of a mixture consisting essentially of about 30–76 parts of N-vinylpyrrolidone monomer and a sufficient quantity of a monomer selected from the group consisting essentially of acrylamide and acrylic acid to make about 100 parts, said layer having a thickness of about 0.005–5 millimeters; and (b) Irradiating said layer, while maintaining it at about 20–30° C., with said high energy radiation to provide a radiation dose of about 0.5–1 megarad, whereby substantially all of said N-vinylpyrrolidone is polymerized.

In specially preferred embodiments of the process recited in Embodiment A, supra:

(1) The group member is acrylamide.
(2) The group member is acrylic acid.
(3) The mixture consists essentially of about 70–75 parts of N-vinylpyrrolidone and a sufficient quantity of monomer selected from the group consisting of acrylamide and acrylic acid to make a total of about 100 parts.

In another preferred embodiment ("Embodiment B") this invention is directed to an improvement in the process for polymerizing N-vinylpyrrolidone by irradiating it with high energy ionizing radiation, said improvement comprising accelerating the rate of polymerization by irradiating a layer consisting essentially of a mixture of about 10–70 parts of N-vinylpyrrolidone and a quantity of a monomer selected from the group consisting of acrylamide and acrylic acid to make about 100 parts, said layer having a thickness of about 0.005–5 millimeters, with a dose of about 0.3–2 megarads of said radiation while maintaining the temperature of said layer at about 0–80° C., whereby substantially all of said N-vinylpyrrolidone is polymerized.

DETAILED DESCRIPTION OF THE INVENTION

It is an object of this invention to provide a process for accelerating the rate of radiation induced polymerization of N-vinylpyrrolidone. It is another object of this invention to provide a method for accelerating the rate of radiation induced polymerization of N-vinylpyrrolidone by adding thereto a monomer selected from the group consisting of acrylamide and acrylic acid before irradiating said N-vinylpyrrolidone with high energy ionizing radiation. Other objects of this invention will be readily apparent to those skilled in the art.

It has been found that acrylamide and acrylic acid, where irradiated in the melt (i.e., in the molten state), undergo polymerization at an extremely rapid rate—at such a rapid rate that it has been characterized "explosive polymerization." I have also found that in both N-vinylpyrrolidone and 2-vinylpyridine, when irradiated with high energy ionizing radiation, are polymerized at slow rates.

I have found that the addition of acrylamide monomer or acrylic acid monomer to N-vinylpyrrolidone monomer greatly increases the rate of radiation induced polymerization of the aforesaid vinylpyrrolidone. I have also found that the addition of acrylamide monomer or acrylic acid monomer to 2-vinylpyridine monomer slightly increases the rate of radiation induced polymerization of the aforesaid vinylpyridine. On the other hand, I have found that the rate of radiation induced polymerization of acrylamide and acrylic acid monomers is drastically reduced if styrene monomer is mixed with acrylic acid or acrylamide monomer before irradiation (see Example XI). Thus, it is not possible to predict the effect, if any, that the addition of monomers selected from the group consisting of acrylic acid and acrylamide will have on the radiation induced polymerization of other monomers.

Radiation induced polymerization processes possess an inherent advantage over chemically induced polymerization processes in that, with the radiation processes, no chemical polymerizing catalyst is incorporated into the reaction mixture, thereby eliminating the necessity for subsequent removal or neutralization of the catalyst which was used to initiate the polymerization.

I have found that the radiation used to induce the polymerization of N-vinylpyrrolidone, when mixed with acrylamide or with acrylic acid, can be any high energy ionizing radiation such as protons, neutrons, gamma rays, and X-rays which are emitted from radioactive isotopes or are generated by appropriate conventional apparatus. However, for convenience I prefer to use high energy electrons. Excellent results have been obtained with radiation doses ranging from about 0.3–2 megarads. Higher radiation doses have also produced excellent results; however, the results obtained do not justify the added expense involved in using doses higher than about 2 megarads. I prefer to use doses of about 0.5–1 megarad.

I have found that the copolymers of N-vinylpyrrolidone with acrylamide or with acrylic acid are especially useful as protective coatings on surfaces of metal, wood, paper, and the like. My process is especially useful for coating surfaces of materials such as wood, paper, paperboard, and the like which would be weakened by or which would not withstand the high temperatures of a heat curing process. For example, a thin layer of the mixed monomers can be applied to the surface of wood, paper, paperboard, or the like and the thus coated surface can be subjected to high energy radiation at about room temperature, in the presence of air, thereby to polymerize the mixed monomers and coat said surface with a protective coating of the resulting copolymer. Further uses of such copolymers will be readily apparent to those skilled in the art.

In the process of this invention it is not necessary to exclude mixtures of monomers from contact with the atmosphere (i.e., from contact with air) while irradiating said mixtures. Of course, the materials undergoing irradiation can be confined in an evacuated container or under an inert gas (e.g., helium or nitrogen) while being irradiated; however, no advantage results for such confinement.

While I prefer to conduct the irradiation of the mixed monomers N-vinylpyrrolidone mixed with acrylamide or with acrylic acid) at about room temperature (e.g., ca. 20–30° C.), I have found that this process can be conducted with excellent results over the temperature range of about 0–80° C.

Where using a mixture of N-vinylpyrrolidone and acrylamide monomers, I prefer to use a mixture comprising about 30–70 parts of N-vinylpyrrolidone monomer plus sufficient acrylamide monomer to make a total of about 100 parts. However, I have obtained excellent results using mixtures comprising about 10–75 parts N-vinylpyrrolidone monomer plus sufficient acrylamide monomer to make a total of about 100 parts. I have found that mixtures comprising less than about 10 parts of acrylamide monomer per 100 parts of N-vinylpyrrolidone monomer polymerize so slowly as to be of questionable value.

Where using mixtures of N-vinylpyrrolidone monomer and acrylic acid monomer, I prefer to use mixtures comprising about 40–75 parts of N-vinylpyrrolidone monomer and sufficient acrylic acid monomer to make a total of about 100 parts. However, I have obtained excellent results with mixtures comprising about 25–90 parts N-vinylpyrrolidone monomer and sufficient acrylic acid monomer to make a total of 100 parts. I have found that mixtures comprising less than about 10 parts of acrylic acid monomer per 100 parts of N-vinylpyrrolidone monomer polymerize so slowly as to be of questionable value.

When using the process of this invention to apply a protective coating to surfaces, I have found that excellent results are obtained when applying the mixed monomers in a thickness of about 0.005–5 millimeters to such surfaces. However, I prefer to apply said mixed monomers in a thickness of about 0.01–1 millimeters.

The term parts, where used in the specification and claims of this application, unless otherwise defined where used, means parts by weight. The term percent (%), where used in the specification and claims of this application, unless otherwise defined where used, means percent by weight.

The following specific but non-limiting examples further illustrate the invention of this application.

EXAMPLE I

A mixture of about 42 parts N-vinyl-2-pyrrolidone monomer and 58 parts acrylamide monomer was applied, as a coating about 3 millimeters (ca. 3 mm.) thick to a 2 inch by 2 inch (2" x 2") sheet of aluminum foil and irradiated in the atmosphere (i.e., in the presence of air) at ambient temperature (ca. 25° C.) with a high energy electron beam using about 2 megarads. The thus irradiated coated aluminum sheet was weighed and "dried", i.e., freed of unreacted monomers, by evaporating to constant weight (i.e., constant to about ±10 milligrams) at about 50° C. in a vacuum oven while passing a stream of air at about 0.2 atmosphere pressure through said oven and over the aforesaid irradiated coated sheet. The weight of the thus "dried" sheet was substantially identical to the weight of said sheet after irradiation and before "drying", thereby showing that the radiation treatment had polymerized substantially all of the mixed monomers applied to said sheet. The thus formed polymer coating adhered firmly to the aforesaid sheet of aluminum, thus constituting a protective coating on the surface of said sheet.

EXAMPLE II

The general procedure of Example I was repeated, but in this instance it was modified by using a mixture of about 71 parts N-vinyl,2-pyrrolidone monomer and 29 parts acrylamide monomer, and applying the mixture of monomers to a 2" x 2" sheet of paper The thus coated paper was irradiated in the atmosphere at about 10° C. with a high energy electron beam using about 1 megarad. In this example, as in Example I, it was found that the radiation treatment had polymerized substantially all of the mixed monomers applied to the sheet, thereby to form a polymer coating on said sheet of paper. Said polymer coating adhered firmly to said sheet thus constituting a protective coating on the surface of said sheet.

EXAMPLE III

The general procedure of Example I was repeated, but in this instance it was modified by applying a mixture of about 54 parts N-vinyl,2-pyrrolidone monomer and 46 parts acrylamide to a 2" x 2" sheet of aluminum foil, irradiating the thus coated sheet of foil in the atmosphere at about 75° C. with a high energy electron beam using about 0.5 megarad. It was found that the radiation treatment had polymerized substantially all of the mixed monomers applied to said sheet of aluminum foil.

EXAMPLE IV

The procedure of Example I was repeated with only one modification—namely, the monomer applied to the aluminum foil was substantially pure N-vinyl,2-pyrrolidone rather than the mixed monomers of Example I. It was found that only about 68% of the monomer was polymerized by irradiation.

EXAMPLE V

The procedure of Example I was repeated with only one modification—namely, the monomer applied to the aluminum foil was a mixture of about 75 parts of 2 N-vinyl,2-pyrrolidone and 25 parts acrylic acid. It was found that the radiation treatment had polymerized substantially all of the mixed monomers applied to the aluminum foil.

EXAMPLE VI

The procedure of Example II was repeated with the following modifications: (a) the monomer applied to the paper sheet was a mixture of about 55 parts N-vinyl,2-pyrrolidone and 45 parts acrylic acid; (b) the radiation dose was about 0.3 megarad; and (c) the radiation was conducted while maintaining the temperature of the coated sheet of paper at about 50° C. It was found that the radiation treatment had polymerized substantially all of the mixed monomers applied to the paper.

EXAMPLE VII

The general procedure of Example I was repeated. However, in this instance it was modified by replacing the mixture of N-vinyl,2-pyrrolidone and acrylamide monomers of Example I with a mixture of 29 parts 2-vinylpyridine monomer and 71 parts acrylamide monomer. It was found that only about 32% of the 2-vinylpyridine monomer was polymerized by the irradiation. In this instance the off-gas from the vacuum oven (air leaving the vacuum oven in which the coated irradiated sheet of aluminum was dried) was analyzed by conventional techniques (infrared and gas chromatography) and found to be free of acrylamide monomer and to contain 2-vinylpyridine monomer.

EXAMPLE VIII

The general procedure of Example VII was repeated but in this instance the mixture of monomers used was 49 parts 2-vinylpyridine and 51 parts acrylamide; the radiation dose was 1 megarad, and the sample was maintained at about 50° C. while being irradiated. Only about 22% of the 2-vinylpyridine was polymerized by the radiation.

EXAMPLE IX

The general procedure of Example I was repeated; however, in this instance the procedure was modified by: (a) coating the sheet of aluminum foil with a mixture of 70 parts 2-vinylpyridine monomer and 30 parts acrylic acid monomer; (b) maintaining the thus coated sheet at about 50° C. while irradiating said sheet with a high energy electron beam using about 1 megarad; and (c) analyzing off-gas from the vacuum "drying" oven. Only about 36% of the 2-vinylpyridine monomer was polymerized by the irradiation. The off-gas from the vacuum oven was found to contain 2-vinylpyridine monomer but to be substantially free of acrylic acid monomer.

EXAMPLE X

The procedure of Example I was repeated with one modification—namely, the monomer applied to the aluminum sheet was substantially pure 2-vinylpyridine rather than the mixed monomers of Example I. It was found that only about 5% of the 2-vinylpyridine monomer was polymerized by the irradiation.

EXAMPLE XI

The general procedure of Example IX was repeated. However, in this instance the procedure was modified by: (a) coating the sheet of aluminum foil with a mixture of about 50 parts styrene monomer and 50 parts acrylic acid monomer; and (b) conducting the irradiation while maintaining the thus coated sheet at about 25° C. Only about 30% of the acrylic acid monomer was polymerized and none of the styrene monomer was polymerized by the irradiation. Off-gas from the vacuum "drying" oven contained both styrene monomer and acrylic acid monomer in the ratio of about 10 parts of styrene monomer per 7 parts of acrylic acid monomer.

In other runs excellent results were obtained by irradiating compositions consisting essentially of 10–90, or 30–70, or 30–76, or 70–75, or 10–70 parts of N-vinylpyrrolidone and sufficient acrylamide or acrylic acid to make 100 parts with high energy ionizing radiation at a total dose of 0.3–2 or 0.5–1 megarads and at a temperature of 0–80° C. or 20–30° C. said compositions having (when first subjected to such radiation) a thickness of about 0.005–5 or 0.01–1 millimeters. In each of these runs substantially all of the N-vinylpyrrolidone was polymerized.

Where repeating the general procedure of Example XI but modifying said procedure by replacing the acrylic acid monomer with acrylamide monomer, only about ⅓ of the acrylamide monomer was polymerized and none of the styrene monomer was polymerized. As used herein the term "parts" means parts by weight unless otherwise defined where used.

I claim:

1. In the process for polymerizing N-vinylpyrrolidone by irradiating said N-vinylpyrrolidone with high energy ionizing radiation, the improvement comprising:
   accelerating the rate of polymerization by;
   (a) preparing a layer of a mixture consisting of about 10–90 parts of N-vinylpyrrolidone monomer and a sufficient quantity of monomeric acrylamide to make about 100 parts, said layer having a thickness of about 0.005–5 millimeters; and
   (b) maintaining the temperature of said layer at about 0–80° C. while irradiating it with a dose of 0.3–2 megarads of said radiation to polymerize substantially all of said N-vinylpyrrolidone.

2. The process of claim 1 wherein said mixture consists of 30–70 parts of N-vinylpyrrolidone monomer and a sufficient quantity of monomeric acrylamide to make a total of about 100 parts.

3. The process of claim 1 wherein the radiation dose is about 0.5–1 megarad.

4. The process of claim 1 wherein the high energy ionizing radiation is a high energy electron beam.

5. In the process for polymerizing N-vinylpyrrolidone by irradiating said N-vinylpyrrolidone with high energy ionizing radiation, the improvement comprising:
   accelerating the rate at which said N-vinyl-pyrrolidone is polymerized by;
   (a) preparing a layer of a mixture consisting of about 30–76 parts of N-vinylpyrrolidone monomer and a sufficient quantity of monomeric acrylamide to make about 100 parts, said layer having a thickness of about 0.005–5 millimeters; and
   (b) irradiating said layer, while maintaining it about 20–30° C., with said high energy radiato to provide a radiation dose of about 0.5–1 megarad to polymerize substantially all of said N-vinylpyrrolidone.

6. The process of claim 5 wherein the mixture consists of 70–75 parts of N-vinylpyrrolidone and a sufficient quantity of monomeric acrylamide to make a total of about 100 parts.

7. In the process for polymerizing N-vinylpyrrolidone by irradiating it with high energy ionizing radiation, the improvement comprising; accelerating the rate of polymerization by irradiating a layer consisting of a mixture of about 10–70 parts of N-vinylpyrrolidone and a quantity of monomeric acrylamide to make about 100 parts, said layer having a thickness of about 0.005–5 millimeters, with a dose of about 0.3–2 megarads of said radiation while maintaining the temperature of said layer at about 0–80° C. to polymerize substantially all of said N-vinylpyrrolidone.

References Cited

UNITED STATES PATENTS

| 3,424,638 | 1/1969 | Marans | 204—159.22 |
| 3,058,899 | 10/1962 | Yanko et al. | 204—159.22 |
| 2,982,762 | 5/1961 | Joeus et al. | 204—159.22 |

MURRAY TILLMAN, Primary Examiner

R. B. TURER, Assistant Examiner

U.S. Cl. X.R.

117—93.31, 161; 260—80.3